United States Patent [19]

Hale et al.

[11] 4,371,047

[45] Feb. 1, 1983

[54] AGRICULTURAL TRACTOR HAVING REVERSE AIR FLOW COOLING

[75] Inventors: Richard A. Hale, Downers Grove; Richard G. Hennessey, Oak Lawn, both of Ill.

[73] Assignee: International Harvester Company, Chicago, Ill.

[21] Appl. No.: 136,870

[22] Filed: Apr. 2, 1980

[51] Int. Cl.³ .............................................. B60K 11/06
[52] U.S. Cl. ................................. 180/54 A; 123/41.7; 180/69 R; 181/204
[58] Field of Search .................. 180/54 A, 89.2, 69 R, 180/69 C, 69.01, 68 R, 296; 181/204, 205, 224, 225; 123/41.7

[56] References Cited

U.S. PATENT DOCUMENTS

| | | | |
|---|---|---|---|
| 2,267,828 | 12/1941 | Klavik | 180/54 A |
| 3,358,787 | 12/1967 | Bangasser et al. | 180/69 R |
| 3,786,891 | 1/1974 | Vogelaar et al. | 180/68 R |
| 4,086,976 | 5/1978 | Holm et al. | 180/68 R X |

Primary Examiner—Joseph F. Peters, Jr.
Assistant Examiner—D. W. Underwood
Attorney, Agent, or Firm—F. David AuBuchon

[57] ABSTRACT

A tractor vehicle (10) is provided with segregated engine (45) and heat exchanger compartments (64). The heat exchanger compartment (64) is supplied with ambient air from an intake grille (24) above the heat exchanger compartment. The process air from the heat exchanger compartment is exhausted forwardly through a front grille (40) location on the tractor. The engine compartment is ventilated by a forced air system induced by the heat exchanger compartment exhaust fan (80). Engine compartment process air is drawn to the downstream side of the primary heat exchanger (76) and is discharged along with the heat exchanger compartment process air, through the front grille of the tractor.

12 Claims, 10 Drawing Figures

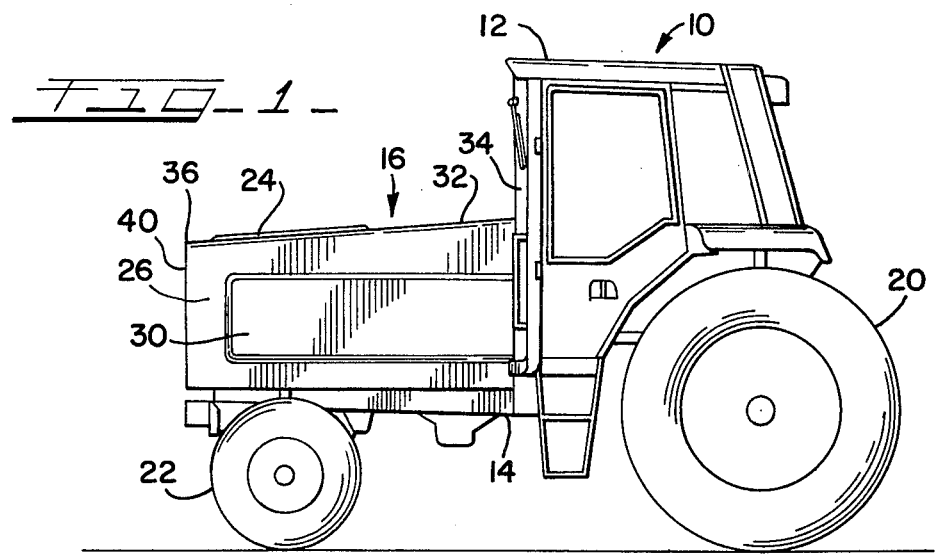
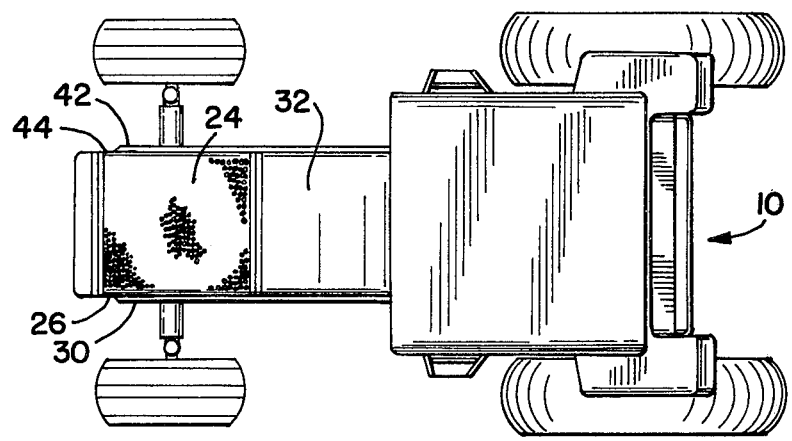
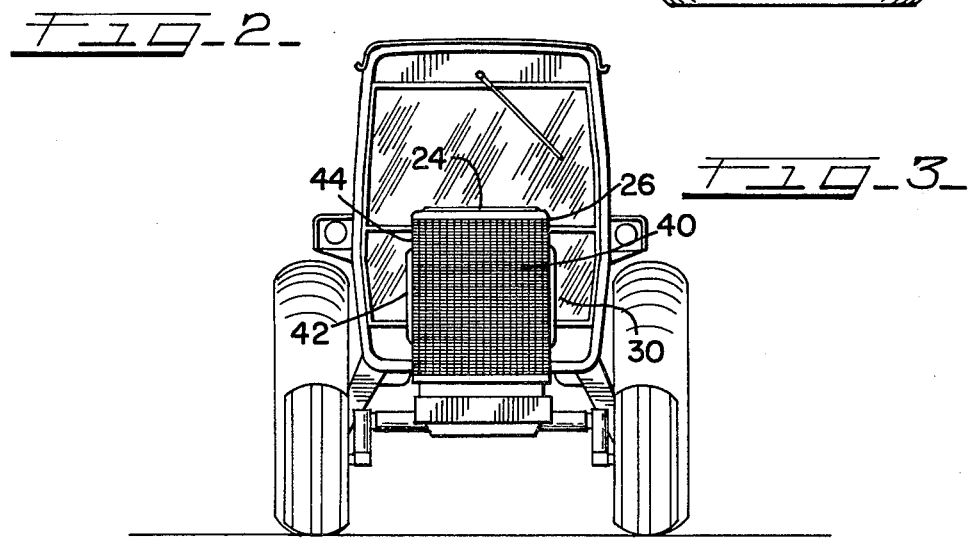

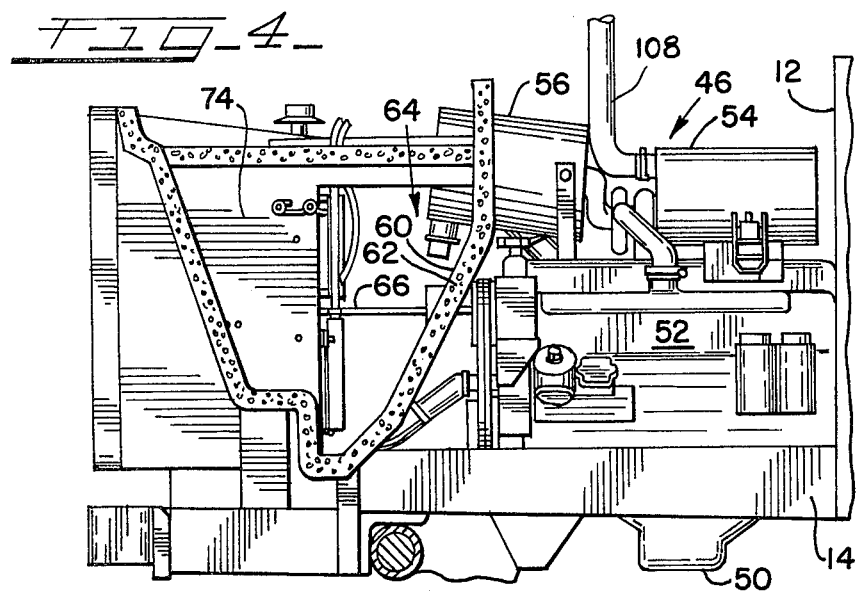
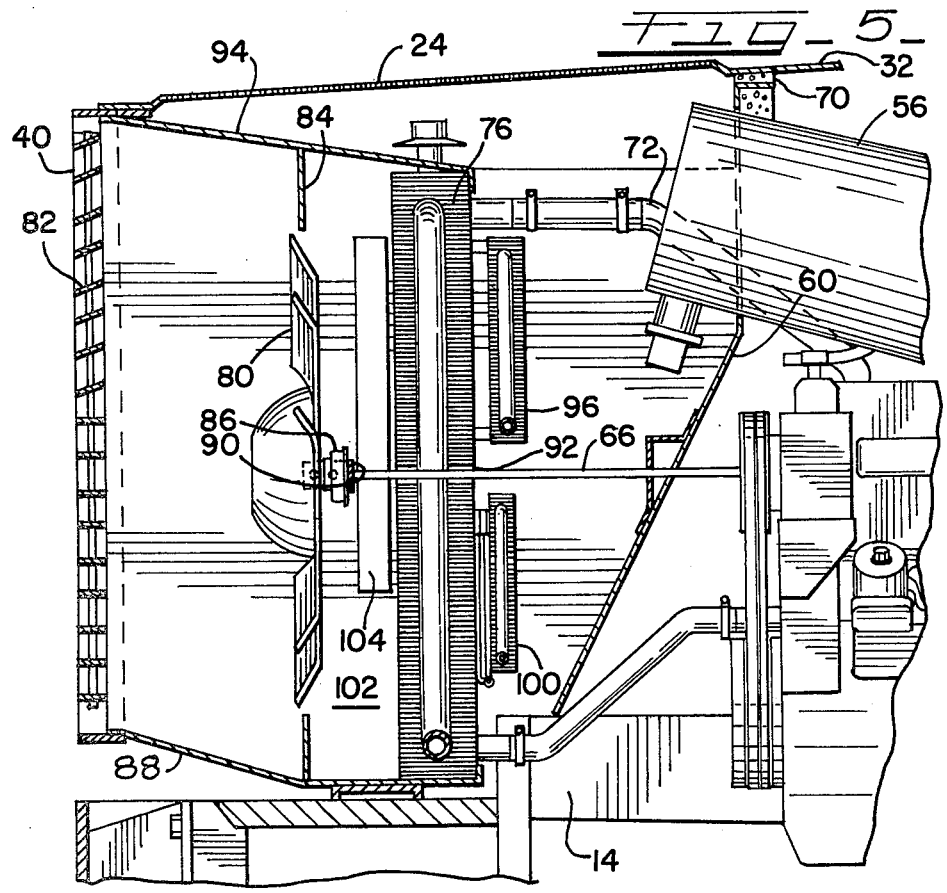

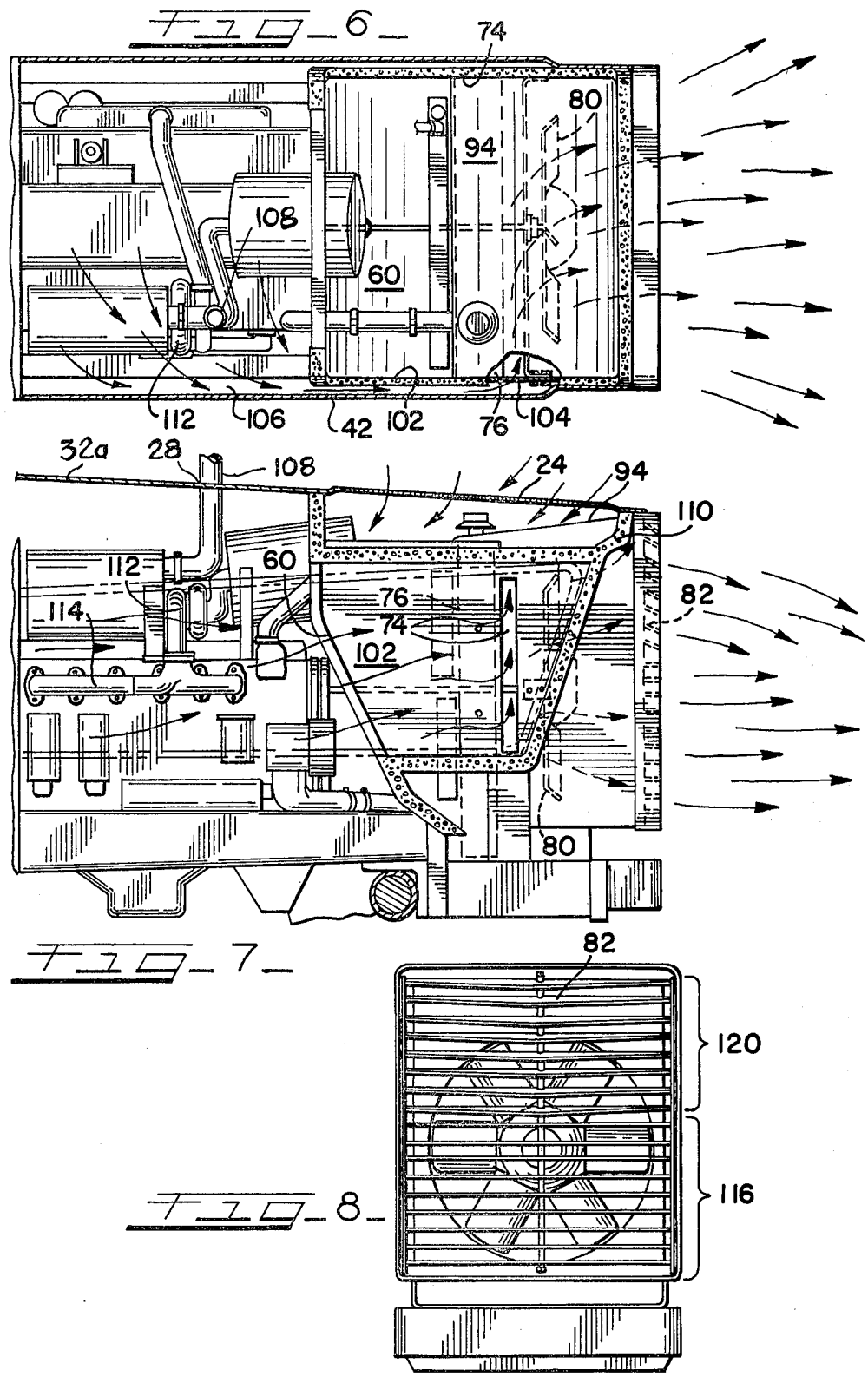

AGRICULTURAL TRACTOR HAVING REVERSE AIR FLOW COOLING

BACKGROUND OF THE INVENTION

1. Field of the Invention:

The invention embodies an agricultural tractor improvement. More specifically a cooling system for a tractor is provided with air intake access on top of the hood and an air discharge through the grille area of the tractor. Separate compartments are provided for the engine and for the various heat exchangers of the tractor with an exhaust duct between the engine compartment and the heat exchanger compartment allowing evacuation of the engine compartment through the use of a radiator fan.

2. Description of the Prior Art:

Current agricultural tractors are all of a similar straight forward design that has been utilized throughout the development of tractors since the early twentieth century. Two wheel drive tractors are typically front engine machines having long hood structures extending from the operator's zone at the rear of the vehicle to the front grille. The engine, part of the transmission and most auxilliary operating equipment is housed under the hood. In tractors having water cooled engines the engine coolant heat exchanger and an air flow inducing fan are provided near the front of the vehicle. In most cases the front grille is the intake access to provide a flow of cooling air to the various heat exchangers. Some tractor models have side air intake grilles with air flow being directed through heat exchangers back toward the vehicle engine.

In liquid cooled tractors the engine coolant heat exchanger or more commonly, radiator, is connected by hoses to the engine block. The radiator and the engine are separated by an engine driven fan of a suction type that draws ambient air through the radiator to allow heat transfer from the radiator to the air stream. The ambient air is heated as it is drawn through the radiator and is then directed, by the circumstance of the conventional layout, over the surfaces of the engine where the air flow further assists in cooling localized hot spots on the engine. This heated air eventually flows outwardly from the engine compartment with flow on the left side of the vehicle directed downwardly and flow on the right side of the vehicle directed upwardly. The heated air impinging on the ground surface will raise dust and chaff under usual farming conditions. Excess ground dust and chaff agitation requires frequent cleaning of cab windows, engine radiators and the air cleaner. The tractor operator is also subjected to this blast of hot air, both from the downwardly directed air flow and the upwardly directed air flow, or if the tractor is equipped with a modern day cab, the exterior of the cab is heated by the heated air; this requires air conditioner capacity that is greater than need be when compared to the instant invention.

The engine noise, including the noise of ancillary equipment such as the cooling fan, is more critical in these times of high horsepower tractors and environmental concerns. The long term exposure to high noise levels leads to undesirable levels of fatigue. The farmer operating his tractor is exposed to these high noise levels for very long periods of time during peak farming seasons when he may work from sunrise to long after sunset preparing his land for seeding and later when harvesting his crop.

In order to minimize the noise levels on tractors it will be necessary to provide baffles around the engine compartment. This development can be seen in the small lawn tractors now being marketed where the usual hood is augmented with side panels extending down to the frame of the vehicle. This solution is feasible with these small tractors as they are typically air-cooled engines in small horsepower sizes. They do not generate the tremendous heat load that a large diesel engine farm tractor generates.

If side sheets were added to contemporary farm tractors for noise attenuation a severe localized engine cooling problem would arise. The engine compartment would still receive a blast of heated air from the radiator fan but the air would have to exhaust out the bottom of the engine compartment. This would lead to two difficulties. First, pockets of heated air would be trapped in the engine enclosure preventing the "washing" of the engine block with the desirable cooling flow of air. This would result in probable engine damage due to overheating. Secondly, all the air being drawn through the radiator would have to escape out under the engine compartment and would cause considerable dust and chaff disturbances which are undesirable.

Several other disadvantages relating to cooling system configurations are inherent in contemporary tractors.

The large tractors require a large volume of air flow through the radiator to ensure adequate cooling. Cooling system capacity becomes sensitive to wind direction when tractors are operated in long fields where the tractor will be operating with a tail wind for long periods of time. Designed in overcapacity is the norm as field operating conditions dictate that the cooling system operate at a given maximum level regardless of wind conditions or vehicle velocity. For instance, when the tractor is traveling directly into the wind the air flow through the radiator is augmented by the differential between the speed of the tractor and the wind speed, therefore head winds often enable cooling to be maximized. On the other hand tail winds, as well as cross winds, do not add velocity to the cooling air flow and the tractor's radiator fan must supply all the required air flow. Thus cooling systems must be designed with this situation as the minimum cooling performance threshold resulting in overcapacity of the cooling system during approximately half of its operating time.

Another disadvantage of contemporary tractors is that the discharged engine heat is directed toward the vehicle operator or the cab thus raising the temperature in an area where it would be desirable to maintain relatively cool temperatures.

In view of these disadvantages of the prior art a revised cooling air flow configuration is set forth in this disclosure.

Among the objects of this invention is a cooling system design that provides for the enclosure of the tractor engine compartment with full side panels in order that noise generated in the engine compartment can be partially contained and attenuated. This full engine enclosure will reduce bypass noise. Noise levels in the operator's area will also be reduced due to the side panels and the reverse flow of the cooling air passing out through the front grille away from the operator's station.

Another object of the invention is to reduce temperatures in the operator's area of the tractor by exhausting cooling air forward from the vehicle rather than toward the operator's area. Also an advantage of the invention is that underhood average temperatures are lowered and can be controlled by the placement of exhaust ducts passing from the engine compartment around the heat exchanger and discharged by the cooling fan at the front grille.

Other advantages realized by utilization of this invention include, but are not limited to, an absence of a fan blast on the ground thereby minimizing dust and chaff agitation and minimized collection of chaff on the inlet screen of the radiators.

An advantage of the intake screen location above the heat exchanger compartment is that the screen is self-cleaning primarily after the engine is shut down thus maximizing air flow to the heat exchangers.

Also a significant advantage of having the screen located above the heat exchanger compartment is that the operator is visually aware of abnormal chaff accumulation on the screen.

The invention provides several cooling system advantages including maximization of cooling system effectiveness as a function of wind direction. Also, with the intake screen covered with ice and/or snow there will be no overheating even at full load as the intake screen is designed to flex thus breaking up any ice formation. The design allows a smooth controlled flow of intake and outlet air as the engine block is not imposed in the path of cooling air flow.

The intake screen is advantageously larger than would be possible with the conventional front grille intake vehicle where the grille size is constrained by hood, width and height.

These as well as other advantages will be recognized through cognizance of the following discussion and drawing figures which disclose the preferred embodiment of the invention.

SUMMARY OF THE INVENTION

A farm tractor is provided wherein the engine and the cooling system are segregated into individual compartments. The heat exchanger compartment houses the cooling fluid heat exchanger, transmission oil cooler, the air conditioner condenser, the air cleaner inlet and the suction type cooling fan. Air enters the compartment through an access screen located on top of the vehicle's hood and is drawn through the various heat exchangers by an engine driven suction fan. The fan pushes the now heated air out through the normal grille area at the front of the vehicle.

A duct, typically embossed into one of the side panels of the engine enclosure, provides a passage for exhausting heated air and engine vapors from the engine compartment. The duct leads to the heat exchanger compartment downstream of the heat exchangers but upstream of the radiator fan so that the fan draws air through the duct and exhausts this air through the front grille with the now heated cooling process air.

BRIEF DESCRIPTION OF THE DRAWING FIGURES

An understanding of the invention and advantages thereof can be appreciated from understanding the following description and drawing figures wherein:

FIG. 1 shows a side elevation view of a tractor vehicle incorporating the invention;

FIG. 2 prevents the simplified top view of the vehicle of FIG. 1 showing the heat exchanger compartment intake screen at the front portion of the hood;

FIG. 3 is a front elevation view of the tractor vehicle of FIG. 1 showing the air discharge grille;

FIG. 4 shows a portion of the tractor vehicle of FIG. 1 with the hood sheet and side panels removed;

FIG. 5 shows a portion of the tractor vehicle of FIG. 1 with the hood sheet and heat exchanger chamber walls partially sectioned to reveal the radiator fan and other equipment;

FIG. 6 is a top view of the engine compartment of the tractor vehicle of FIG. 1 with the hood sheet removed to show air flow from the engine compartment out the front grille;

FIG. 7 shows a portion of the tractor vehicle of FIG. 1 with the right side panel removed to show air flow from the engine compartment out the front grille;

FIG. 8 is a front view of the air deflecting slats behind the front grille shown in FIG. 3.

DETAILED DESCRIPTION OF THE INVENTION

Figure 9:
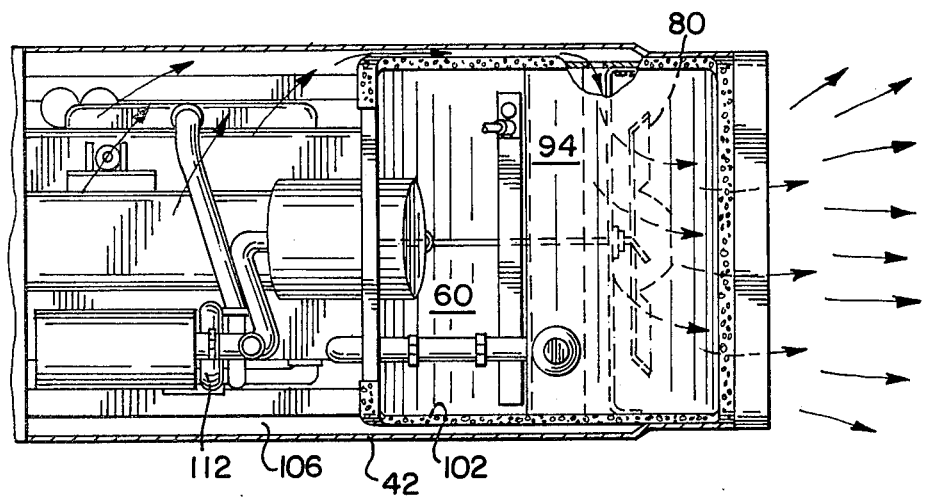
FIG. 9 is a top view of an alternative engine compartment of the tractor vehicle of FIG. 1 with the hood sheet removed to show air flow from the engine compartment through the left side duct and out the front grille.
Figure 10:
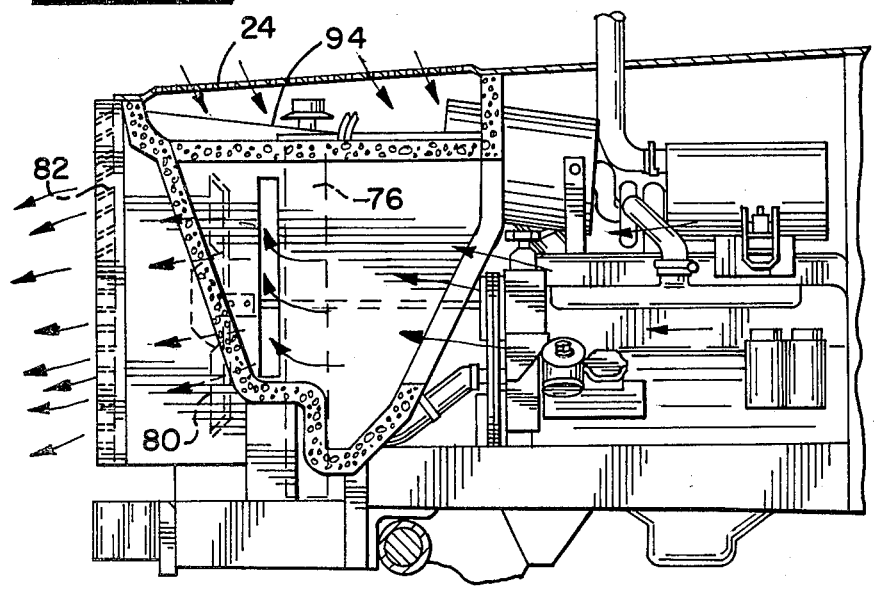
FIG. 10 shows a portion of the tractor vehicle of FIG. 1 with the right side panel removed to show an alternative air flow path from the engine compartment out the front grille.

FIG. 1 presents a tractor vehicle generally 10 incorporating the instant invention. A cab 12 from wherein the vehicle operator operates the vehicle is supported on a frame 14 as is the engine and heat exchanger compartment of the front portion of the tractor generally 16. The cab is an optional enclosure for the usual operator's station. Large diameter driven wheels, such as 20, and steerable front wheels 22 support the vehicle at all four corners in a well known manner.

Significant items shown in FIG. 1 are the heat exchanger intake screen 24 and the left side panel 26 completely enclosing the left side of the forward portion of the vehicle. The panel 26 includes a raised portion 30 extending outwardly from the general reference plane of the side panel.

The hood sheet 32 is continuous from the cab windshield 34 to the top edge 36 of the front grille 40.

FIG. 2 presents a simplified top view of the tractor vehicle generally 10 of FIG. 1. In this view the intake screen 24 can be seen as a perforated screen at the forward part of the hood sheet 32. The intake screen 24 is, in this embodiment, as wide as the hood sheet and about half the length of the hood. Its dimensions are illustrative and could of course be longer or narrower to fit specific installation requirements. The screen is shown as a perforated screen but could also be a louvered cover or another type of ventilated cover that would allow relatively unimpeded passage of air therethrough.

The extent of projection of the raised portion 30 of the left side panel 26, as well as the projection of a similar raised portion 42 in the right side panel 44, from the reference elevation of each panel can be seen in FIG. 2.

In FIGS. 1, 2 and 3 the front end enclosure is shown in its simplest form wherein the engine exhaust pipe which may extend upwardly through the hood is not shown. An embodiment wherein the exhaust pipe extends upwardly through the hood sheet is shown in FIGS. 4, 6 and 7.

In FIG. 3 the front grille 40 is clearly shown. The grille in FIG. 3 is actually a perforated cover screen that is the exterior surface of a more complex grille structure which will be explained further on. The front grille 40 is perforated to allow the outward passage of air through its perforations without unnecessary impedance.

Notice the left 30 and right 42 side raised portions projecting from the left 26 and right 44 side panels respectively. The raised portions may extend from the engine enclosure compartment location to the vicinity of the evacuation duct air delivery port 104. The heat exchanger intake screen 24 can be seen as projecting slightly above the reference plane of the hood sheet 32 in this figure.

FIG. 4 shows the front portion of the tractor vehicle of FIG. 1 with the hood sheet and side panels removed. The left front wheel assembly has also been removed for the sake of clarity. In this view it can be seen that the engine, generally 46, is supported on the frame 14 in front of the cab 12 (partially shown). A firewall separates the cab, or an operator's station on tractors without cabs, from the engine. The oil pan 50 can be seen extending below the frame 14 as the bottom of the engine compartment is not enclosed.

Above the engine block 52 the muffler 54 and the air cleaner 56 are shown.

The forward bulkhead of the engine compartment is defined by a bulkhead panel 60, hidden in FIG. 4 by a foam strip 62 that seals the edge of the bulkhead panel and the left side panel when the panel is in place. The right side panel is not sealed by foam along its interface with the bulkhead panel in the area where the raised duct portion of the panel traverses the edge of the bulkhead panel. The air cleaner 56 projects through an opening in the bulkhead panel into the heat exchanger compartment generally 64. The bulkhead panel 60 is also provided with apertures to accommodate a fan drive shaft 66 and the upper water hose from the engine to the radiator. The bulkhead panel in the embodiment shown is the forward bulkhead of the engine compartment enclosure and also defines the rear wall of the heat exchanger compartment.

FIG. 5 is an enlargement of the front portion of FIG. 4 with some interior panels removed, the hood sheet 32 and the intake screen 24 and various interior baffles are sectioned. The air cleaner 56 projects through the bulkhead panel 60 which is shown extending from the frame to the hood sheet 32. A foam strip 70 separates the hood sheet 32 from the top edge of the bulkhead panel.

The fan drive shaft 66 and the upper radiator hose 72 also pass through the bulkhead panel.

The left side interior baffle 74 of FIG. 4 has also been removed in FIG. 5 to expose the engine coolant heat exchanger or radiator 76, the fan 80 and the air discharge deflecting slats 82 behind the front grille 40. The heat exchanger mounting location divides the enclosed heat exchanger compartment into an upstream section and a downstream section. A fan shroud 84 encircles the fan 80 to improve efficiency. The fan 80 supported by a bearing 86 on the front of the fan drive shaft 66 which is in turn supported on a transverse bearing support 90. The radiator 76 is provided with a through aperture 92 to accommodate the fan drive shaft 66.

An upper baffle 94 seals the top of the heat exchanger compartment from the front grille to the intake side or upstream side of the radiator.

A transmission oil cooler 96 and an air conditioning condenser 100 may also be provided in the heat exchanger compartment.

A right side interior baffle 102 can be seen in FIG. 5. It is similar to the left side interior baffle 74 of FIG. 4 but is further provided with an elongated aperture 104, or exhaust duct air delivery port, for allowing air from the engine compartment to be drawn into the heat exchanger compartment downstream of the radiator 76 by the fan 80 to be exhausted out an open air discharge port herein the front grille 40. A bottom panel 88 extends generally from the base of the radiator to the front grille assembly.

The crux of this invention is the method of directing air flow through the heat exchangers and out an air discharge port at the front of the vehicle while at the same time the fully enclosed except for the open bottom and the engine compartment evacuation duct, engine compartment is evacuated by the radiator fan. The arrangement can best be seen in FIGS. 6 and 7 where the air flow patterns of the reverse air flow cooling system are illustrated.

In FIG. 6 the top view with the hood sheet removed shows air flow symbolized by the arrows, being drawn by the fan 80 (hidden behind the upper baffle 94) from the engine compartment through the duct 106 formed by the raised portion 42 of the right side panel 44. Air from the engine compartment is segregated from air being drawn into the heat exchanger compartment, through the top air entry port, by the bulkhead panel 60 and the right side interior baffle 102. The elongated aperture 104 provides the access where air from the engine compartment enters the cooling air air stream. Notice that the exhaust duct air delivery port 104 is downstream from the radiator 96 but upstream from the fan 80 location such that the engine compartment air is not mixed with the cooling air from the heat exchangers until the ambient air has passed through the various heat exchangers.

The heat exchanger chamber air flow pattern is best seen in FIG. 7 where the arrows above, entering and going through the heat exchanger intake screen 24 show the access location for ambient air entry into the heat exchanger chamber. The air flow is directed by the bulkhead panel 60, the upper baffle 94 and the left side interior baffle 74 and the right side interior baffle 102 to the bank of heat exchangers including the radiator 76. The driven radiator fan 80, an airflow inducing fan, located in the downstream section of the heat exchanger compartment draws the air through the heat exchangers and exhausts the now heated air forwardly through the air discharge deflecting slats 82.

It should be noted that the foam insulation such as 110 in FIG. 7 is used to seal the outer surfaces of the various baffles and the inner surfaces of the side panels. The foam does not extend along the edge of the bulkhead panel 60 in the area where the duct 106 passes from the engine compartment to the heat exchanger compartment. However, since the preferred embodiment includes only an elongated aperture 104 and a functional duct 106 on the right side of the tractor the left side edge of the bulkhead panel 60 is provided with foam such as 62 in FIG. 1.

FIGS. 4, 6 and 7 also show an upwardly extending exhaust pipe 108 that extends through an aperture 28 in the hood sheet 32A. This exhaust pipe embodiment is an alternative to the embodiment shown in FIGS. 1–3, for instance, which are not specific in setting forth the exhaust pipe route.

The preferred embodiment shows the use of only a single engine evacuation duct 106 (including the elongated aperture 104). However, it is contemplated that a pair of ducts could be used, one duct being on each side of the engine through the raised portion of the side panels. Also the engine evacuation duct is shown in this preferred embodiment as being on the right side of the engine. Obviously, it is contemplated that the duct could be incorporated into the left side instead. The right side was shown as the preferred embodiment as it is closer to one of the hot spots in the engine compartment, that being the turbocharger 112 and the exhaust manifold 114. Drawing figures of these two alternative embodiments are felt to be unnecessary as they would be duplicative (mirror images of the relevant components) of what is shown in FIGS. 6 and 7.

FIG. 8 shows the front air discharge grille assembly with the cover screen removed to expose the air discharge deflecting slats 82. The cover screen is simply a perforated screen as shown in FIG. 3 with a large percentage of open area to allow relatively unencumbered flow and yet provide a stylisticly appealing front view of the tractor. It also protects the slats 82 from being damaged or bent from desirable attitudes.

The air discharge deflecting slats 82 are arranged in specific angular displacements to direct the discharge of the air in a desired pattern. The lower section of slats, bracketed items 116 direct the air flow straight forward as shown by the lower set of arrows in FIG. 7 while the upper set of slats, bracketed as item 120 direct the flow of air downwardly as shown by the upper set of arrows in FIG. 7. By this air flow pattern the heated air and engine vapores are discharged away from the operator and air flow is prevented from agitating the dust and chaff on the ground. The air flow pattern tends to blow any dust, chaff, or plant foliage away from the tractor thus keeping the vehicle radiator and its various filters cleaner than is usual with more conventional tractors that suck air and foliage into radiator and other heat exchangers.

As to the top intake screen its location is very advantageous in several regards. Firstly, it is not subjected to the normal chaff blocking as it is high enough to be out of the usual area of the crop. A second advantage is that cross winds, tail winds or head winds, naturally occurring or due to the velocity of the tractor will tend to blow off any accumulated chaff that does happen to land on the intake screen. Another unique aspect of the top intake screen is that it is self-cleaning when the tractor vehicle is shut off. The residual heat of the heat exchangers will tend to radiate upwardly due to convection and will raise various chaff or debris that has accumulated on the screen and cause this material to be waffed away from the screen or blown away by the slight ambient breezes blowing across the screen. The top intake screen is subject to only light chaff such as leaves without stems whereas conventional systems suck stemmed leaves off plants into the front intake screens. The stems then lock the trash onto the screen which then will not fall off.

Thus it is apparent that there has been provided, in accordance with the invention a tractor vehicle having a reverse air flow cooling system that fully satisfies the objects, aims and advantages set forth above. While the invention has been described in conjunction with specific embodiments thereof, it is evident that many alternatives, modifications and variations will be apparent to those skilled in the art in light of the foregoing description. For instance, the inventors contemplate that this reverse air flow system would be equally effective on a four wheel drive tractor vehicle. Accordingly, this disclosure is intended to embrace all such alternatives, modifications and variations as fall within the spirit and broad scope of the appended claims.

What is claimed is:

1. In an off-highway vehicle supported on a plurality of wheels said vehicle comprising an enclosed engine compartment having an open bottom and an engine compartment evacuation duct; an enclosed heat exchanger compartment having a top air entry port, an evacuation duct air delivery port for communication with said engine compartment evacuation duct and an air discharge port; a heat exchanger mounted in said heat exchanger compartment between said top air entry port and said air discharge port; an air flow inducing fan located in said heat exchanger compartment between said heat exchanger and said air discharge port for drawing air through said heat exchanger from said top air entry port and further drawing air from said engine compartment evacuation duct wherein said enclosed engine compartment comprises:

a left side panel extending longitudinally from a rear portion of said enclosed engine compartment to said air discharge port of said enclosed heat exchanger compartment and said left side panel extending vertically from said bottom of said enclosed engine compartment and the bottom of said enclosed heat exchanger compartment to a top of said enclosed engine compartment and to a top of said enclosed heat exchanger compartment;

a right side panel extending longitudinally from the rear portion of said enclosed engine compartment to said air discharge port of said enclosed heat exchanger compartment and said right side panel extending vertically from the bottom of said enclosed engine compartment and the bottom of said heat exchanger compartment to a top of said enclosed engine compartment and to a top of said enclosed heat exchanger compartment, said right side panel further having a raised portion projecting outwardly therefrom for forming said engine compartment evacuation duct on an inner surface of said panel and extending longitudinally from said enclosed engine compartment to said evacuation duct air delivery port;

the continuous unperforated hood sheet covering said engine compartment extending from the top of said left side panel to the top of said right side panel.

2. The invention in accordance with claim 1 wherein said hood sheet is provided with an aperture for accommodating an exhaust pipe of an engine in said enclosed engine compartment.

3. The invention in accordance with claim 1 wherein said left side panel incorporates a raised portion projecting outwardly therefrom for forming said engine compartment evacuation duct on an inner surface of said panel and extending longitudinally from said enclosed engine compartment to said enclosed heat exchanger compartment.

4. The improvement in an agricultural tractor including an engine and having an operator's station supported on a frame and a front portion of the tractor supported on said frame, said frame supported on a plurality of wheels comprising:

an engine compartment enclosure being enclosed on the left side by a left side panel, on the right side by a right side panel, on the top by a hood sheet extending from said operator's station forwardly to a perforated screen portion of said hood sheet and extending from said left side panel to said right side panel, a firewall between said operator's station and said engine, and a forward bulkhead extending laterally from said left side panel to said right side panel defining the front of said enclosed engine compartment;

an enclosed heat exchanger compartment in proximity to said enclosed engine compartment having a top air entry port, an air discharge port, a left side interior baffle, a right side interior baffle having an aperture describing an evacuation duct air delivery port, a bottom panel and a bulkhead panel arranged to form said enclosed heat exchanger compartment;

an engine compartment evacuation duct comprising said right side panel extending from said engine compartment enclosure to said enclosed heat exchanger compartment, said right side panel having a deformed inner surface defining said engine compartment evacuation duct extending longitudinally from said enclosed engine compartment to said evacuation duct air delivery port;

a heat exchanger mounted in said heat exchanger compartment;

a driven radiator fan located in said heat exchanger compartment for drawing air through said heat exchanger and through said engine compartment evacuation duct to be exhausted forwardly away from said vehicle operator's station.

5. The invention in accordance with claim 4 wherein said deformed inner surface being a raised portion projecting outwardly therefrom describing said engine compartment evacuation duct.

6. The improvement in an agricultural tractor including an engine and having an operator's station supported on a frame and a front portion of the tractor supported on said frame, said frame supported on a plurality of wheels comprising:

an engine compartment enclosure being enclosed on the left side by a left side panel, on the right side by a right side panel, on the top by a hood sheet extending from said operator's station forwardly to a perforated screen portion of said hood sheet and extending from said left side panel to said right side panel, a firewall between said operator's station and said engine, and a forward bulkhead extending laterally from said left side panel to said right side panel defining the front of said enclosed engine compartment;

an enclosed heat exchanger compartment in proximity to said enclosed engine compartment having a top air entry port, an air discharge port, a left side interior baffle, a right side interior baffle having an aperture describing an evacuation duct air delivery port, a bottom panel and a bulkhead panel arranged to form said enclosed heat exchanger compartment;

an engine compartment evacuation duct comprising said left side panel extending from said engine compartment enclosure to said enclosed heat exchanger compartment, said left side panel having a deformed inner surface defining said engine compartment evacuation duct extending longitudinally from said enclosed engine compartment to said enclosed heat exchanger compartment;

a heat exchanger mounted in said heat exchanger compartment;

a driven radiator fan located in said heat exchanger compartment for drawing air through said heat exchanger and through said engine compartment evacuation duct to be exhausted forwardly away from said vehicle operator's station.

7. In an off highway vehicle supported on a plurality of wheels, the improvement comprising:

an enclosed engine compartment having a bulkhead panel at the front of said engine compartment, a hood sheet at the top of said engine compartment, a left side panel and a right side panel provided with an engine compartment evacuation duct;

a heat exchanger compartment forward of said enclosed engine compartment including a bulkhead panel forming the rear wall of said heat exchanger compartment, a left side interior baffle attached to and extending forwardly from said bulkhead panel, a right side interior baffle also attached to and extending forwardly from said bulkhead panel, said right side interior baffle provided with an aperture aligned with said engine compartment evacuation duct of said right side panel of said enclosed engine compartment, an upper baffle partially enclosing the top portion of said heat exchanger compartment and connected with said left and right interior baffles, a bottom panel connected with said left and right interior baffles, said left baffle, right baffle, upper baffle and bottom panel forming an air discharge port and said bulkhead panel, left baffle, right baffle and said upper baffle forming a top air entry port;

a heat exchanger mounted vertically in said heat exchanger compartment, said heat exchanger provided with a through aperture;

a suction type fan, supported on a drive shaft passing through said aperture in said heat exchanger, located forward of said heat exchanger and forward of said aperture in said right side interior baffle whereby said fan will draw air into said top air entry port, through said heat exchanger and push said air forwardly out said air discharge port while simultaneously drawing air from said enclosed engine compartment through said engine compartment evacuation duct and said aperture aligned therewith provided in said right side interior baffle and pushing said air out said air discharge port.

8. The invention in accordance with claim 7 wherein said engine compartment evacuation duct comprises a raised portion of said right side panel of said enclosed engine compartment extending longitudinally from said engine compartment forwardly past said radiator to said aperture of said right interior baffle.

9. The invention in accordance with claim 7 wherein said aperture in said right side baffle comprises an exhaust duct air delivery port being an elongated vertical aperture located in said right interior baffle in front of a plane defined by said heat exchanger and before a plane defined by said suction fan.

10. The invention in accordance with claim 7 wherein said hood sheet of said engine compartment extends as an unperforated sheet forwardly to an upper edge of said bulkhead panel and further extends forwardly to the front of said vehicle over said heat exchanger compartment as a perforated panel.

11. The invention in accordance with claim 7 wherein said suction type fan is an engine driven fan driven through said drive shaft and supported by a bearing support attached to respective left and right side interior baffles.

12. The invention in accordance with claim 7 wherein said bulkhead panel of said heat exchanger compartment is provided with a plurality of apertures including a first aperture for accommodating an air cleaner intake and a second aperture for accommodating said fan drive shaft.

* * * * *